United States Patent
Tripathi et al.

(10) Patent No.: US 8,181,245 B2
(45) Date of Patent: May 15, 2012

(54) PROXY-BASED MALWARE SCAN

(75) Inventors: Ashutosh Tripathi, Hyderabad (IN); Subrata Roychoudhuri, Jharkhand (IN)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/764,931

(22) Filed: Jun. 19, 2007

(65) Prior Publication Data

US 2008/0320548 A1  Dec. 25, 2008

(51) Int. Cl.
*H04L 29/06* (2006.01)
*H04L 9/00* (2006.01)
*H04L 9/32* (2006.01)
*G06F 7/04* (2006.01)

(52) U.S. Cl. .............. 726/22; 726/23; 726/24; 713/187; 713/188; 713/189

(58) Field of Classification Search .............. 726/22
See application file for complete search history.

(56) References Cited

U.S. PATENT DOCUMENTS

| | | | |
|---|---|---|---|
| 5,987,621 A | 11/1999 | Duso et al. | |
| 6,442,694 B1 | 8/2002 | Bergman et al. | |
| 6,697,341 B1 | 2/2004 | Roy | |
| 7,046,779 B2 | 5/2006 | Hesse | |
| 7,061,871 B2 | 6/2006 | Sheldon et al. | |
| 2002/0143850 A1* | 10/2002 | Caronni et al. | 709/201 |
| 2002/0147915 A1 | 10/2002 | Chefalas et al. | |
| 2003/0167418 A1 | 9/2003 | Zhu et al. | |
| 2003/0210694 A1 | 11/2003 | Jayaraman et al. | |
| 2004/0168110 A1 | 8/2004 | Fuldseth et al. | |
| 2005/0216733 A1 | 9/2005 | Keohane et al. | |
| 2006/0007943 A1 | 1/2006 | Fellman | |
| 2006/0075276 A1* | 4/2006 | Kataria et al. | 714/4 |
| 2006/0095971 A1 | 5/2006 | Costea et al. | |
| 2006/0200550 A1 | 9/2006 | Nelson et al. | |

OTHER PUBLICATIONS

International Search Report and Written Opinion for International Application No. PCT/2008/066128, mailed Dec. 29, 2008, 10 pages.
Paul Robichaux. Shields Up! Getting Better Protection with Microsoft Forefront Security for Exchange Server and Microsoft Forefront Security for SharePoint. Published: Oct. 2006. http://download.microsoft.com/download/8/4/c/84ce9920-fec5-49f0-800b-effad26503d7/forefront_server_security_business_value_white_paper.doc.
Avaya. Secure Web Conferencing. Nov. 2004. http://www.avaya.com/master-usa/en-us/resource/assets/whitepapers/ef-mis2563.pdf.
FaceTime Enterprise Edition™ for Microsoft® LCS. http://www.facetime.com/pdf/ds_enterpriseedition_LCS.pdf. last accessed Apr. 5, 2007.

* cited by examiner

*Primary Examiner* — Longbit Chai
(74) *Attorney, Agent, or Firm* — Zete Law, P.L.L.C.; MacLane C. Key

(57) ABSTRACT

A system that employs out-of-process ('out-of-proc') architectures with respect to malware scanning related to network services applications is provided. The 'out-of-proc' malware (e.g., virus) scanning is employed in connection with a web conferencing server. This architecture enables more versatile options related to scanning, for example, selective bypass in a crisis situation.

20 Claims, 10 Drawing Sheets

PROXY-BASED MALWARE SCAN

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well.

In accordance with the increases in computer technology, web conferencing has become commonplace in today's business society. Web (or Internet) conferencing is often used to conduct live meetings by way of a network, for example, the Internet. As the Internet continues to evolve, the meetings or 'web conferences' that often included nothing more than group communications via a message board, gradually developed into live or synchronous meetings.

Most often, in a web conference, participants connect via the network (e.g., Internet) from their own personal terminal or workstation. This connection enables real-time, or almost real-time, communication to other participants via the network. This connection is most often facilitated through an application provided by a 'host' or service provider. The application can be a downloaded application on each of the connected computers or a web-based application where the attendees will simply access a 'URL' (universal resource locator) or website meeting address to enter the live meeting or conference.

Today's web conferencing solutions enable users to exchange data and files (e.g., slide presentations, accounting document, etc.). Unfortunately, this ability to transfer documents leaves the system vulnerable to malware (e.g., viruses) and other harmful agents. To combat these undesirable and destructive agents, in-process or 'in-proc' scanning software is most often employed to cleanse documents that are both uploaded and downloaded during a conference. Unfortunately, performance of the conferencing system is directly related to the functionality of scanning applications. In other words, if there is a problem with the 'in-proc' scanning application, the web conference application will experience similar effects since the functionalities are not designed to work independently.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that employs out-of-process ('out-of-proc') architectures with respect to malware scanning related to network services applications. In a specific aspect, 'out-of-proc' malware (e.g., virus) scanning is provided as related to a web conferencing server. It will be appreciated that this architecture enables more versatile options related to scanning as was available in connection with conventional web services applications, which employed 'in-proc' or in-process techniques.

In a particular aspect, the subject innovation can monitor the out-of-proc scanning application for availability and/or performance related issues. Upon identification of an outage or issue, the system can dynamically adjust operation thereby alleviating effects upon the supported network application (e.g., web conferencing application). In one embodiment, the system can optionally enable users to bypass scanning operations so as to continue use of the networking application.

In other aspects, the system can employ throttling or load-balancing mechanisms in order to address overload conditions. Still further, logic can be employed to identify malicious attacks upon the out-of-proc scanning applications. Recovery mechanisms can be employed to restart in the scanning application once the outage, overload, or attack has been addressed or alleviated. In yet another aspect thereof, machine learning and reasoning mechanisms are provided that employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
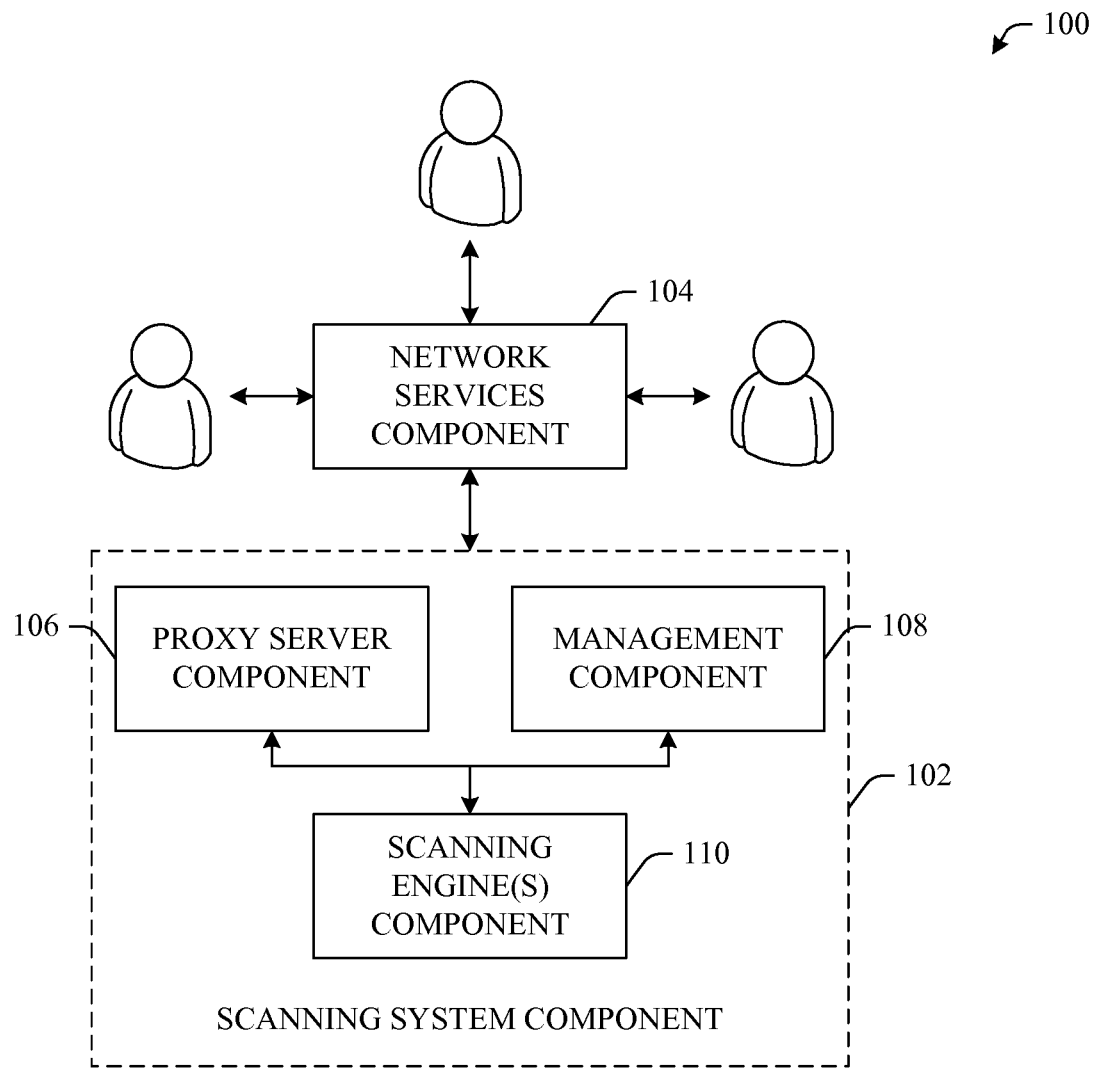
FIG. 1 illustrates a system that facilitates out-of-proc (out of process) scanning applications related to a network services component in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates remote access to a virus scanning engine or application within a network conferencing environment. For example, within a conferencing environment, users often exchange data and documents by way of file transfer (e.g., uploading and downloading). In these instances, because it is not always possible to have complete confidence in the source's malware scanning protocol, it is prudent for the receiver to scan the transferred data for viruses and other harmful components before accepting the data. Similarly, the data is often scanned by the source upon uploading into the conference application for transfer.

Unfortunately, problems occur with the availability of these scanning programs and application. For instance, it is not uncommon for the scanning component to fail and render itself unavailable. Moreover, heavy loads in traffic may also render the scanning functionality useless. Because conference servers today are preferred an relied upon to be available 24×7, it is particularly important to address these scenarios where scanning applications become unavailable or their functionality is hampered by system conditions such as overload. The subject system 100 discloses mechanisms by which these scenarios can be alleviated. Although many of the examples described herein are directed to 'virus' scanning, it is to be appreciated that other data integrity systems can be employed without departing from the spirit and scope of the innovation and claims appended hereto. In other words, the innovation can be employed in procedures that scan data for most any harmful agent as well as incompleteness or corruption.

Referring again to FIG. 1, system 100 can include a scanning component 102 that enables data integrity scanning with reference to a network services component 104, including, without limitation, a web conference service or the like. As shown in FIG. 1, the scanning component 102 is external, or remote (e.g., out of process (out-of-proc)), from the network services component 104. It is to be understood that these components can be located co-located into the same physical location without departing from the scope of the innovation as described and disclosed herein so long as the scanning functionality remains out-of-proc from the network services component 104.

With regard to web (or other network) conferencing hosted services (e.g., 104) or most any other services which are hosted over Internet or other network, it is desirable to provide users not only robust security but also continuous availability (e.g., 24×7) of the functionality for which the service is intended (e.g., conferencing services). One of the potential threats for a service which allows files to be transferred across the network or Internet is the attack by viruses or other harmful agents. Conventionally, internal (e.g., in process (in-proc)) virus scanning software available in the industry are deployed for preventing any such attach however, strict enforcement of the same can potentially sacrifice the availability of a service which is dependent upon transfer of files.

In addition to intelligent detection of failure and consequent recovery of malware scanning software, the innovation can address threats based on distinction between genuine load conditions and attacks on scanning software where it causes few timeouts by stalling or handling such poison pills. The innovation also includes handling situations where virus scanning software cannot recover by allowing users to decide upon uploading or downloading files which are considered safe by the user, for example, scanned from within enterprise malware scanning software.

In doing so, scanning component 102 can include a proxy server 106 and a management component 108 which regulate operation and access to scanning engines 110. In other words, unlike conventional systems where the scanning operation was integral to the network services component 104 (e.g., network conference server), here, these scanning components 110 can be externally managed by way of use of a management component 108 and/or a proxy server component 106.

In a hosted service environment (e.g., system 100), companies can provide customers a service to have a meeting over the Internet through conferencing utilities or other similar products. In such scenarios, as illustrated in FIG. 1, users join the meeting where they can upload and download files. To ensure safety from virus attacks, virus scanning software solutions are most often deployed. Conventionally, these solutions were integral (e.g., in-proc) to the conferencing utilities and other similar products. As will be understood, this arrangement severely limited any ability to control or manage operation of the virus scanning solutions separate from the conference utilities. In other words, when one crashed, the crash rendered the other unavailable.

Unfortunately, due to the integral use of virus scanning in conventional systems, strict enforcement of virus scanning software sometimes sacrifices the availability of the service which is dependent upon transfer of files itself in the following ways. Virus scanning could corrupt the files while cleaning which might affect the intent of the service at the core. There are also situations where virus scanning software might be subject to any poison pill which might bring down virus scanning software and hence cause the actual mail or conferencing service to be unavailable.

Ideally, any failure of the virus scanning software should not cause the service to be unavailable. Despite load balancing in heavy load conditions virus scanning software may be subjected to peak load conditions which cause the service to be unavailable for certain period of time. It is important for a service such as mailing or conferencing to reach a balance between the availability of its service and virus scanning software. Many times, the user who has his/her own virus scanning software feel annoyed by the service being unavailable because there is some malfunction in virus scanning software deployed by the service provider (e.g., integral to the network services component 104). As will be understood, any redundancy in virus scanning operations is costly. Thus, the innovation discloses a system 100 that decouples the scanning component 110 from the network services component 104 thereby enabling more control over the operation of the scanning component 102 generally.

FIGS. 2, 3, 4 and 5 illustrate methodologies of managing virus scanning applications in a network services environment (e.g., web conferencing) in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Essentially, FIGS. 2, 3, 4 and 5 address four scenarios addresses by the innovation. More particularly, these figures address scenarios where a virus scanning application fails, timeouts, is attacked by malicious sources and is controlled in accordance with a policy respectively. Each of these scenarios will be described in greater detail in accordance with the respective figure. It is to be understood that these scenarios are not to be an exhaustive list of how the functionality of the innovation can be employed. Thus, it is to be understood and appreciated that other examples can exist which employ the functionality described herein. These additional embodiments are to be included within the scope of the innovation and claims appended hereto.

Figure 2:
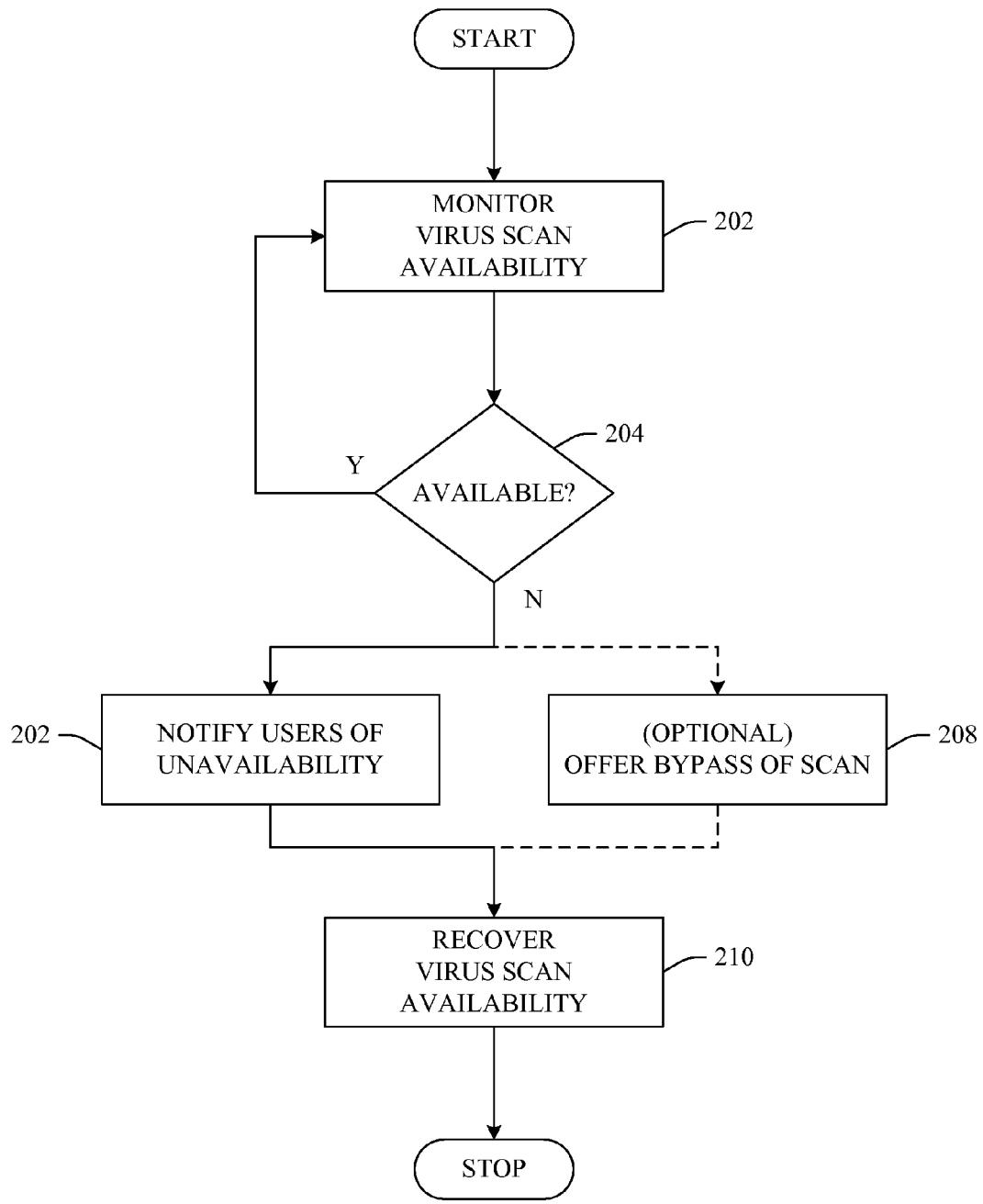
FIG. 2 illustrates an example flow chart of procedures that facilitate monitoring availability of malware scanning mechanisms in accordance with an aspect of the innovation.

Referring now to FIG. 2, an example flow chart of procedures that facilitate identification of a scanning failure and recovery thereof is shown. At 202, virus scan availability can be monitored. As described above, this scanning operation can be related to most any harmful data and/or code without departing from the spirit and scope of this disclosure and claim appended hereto. In operation, this monitoring act can be enabled by way of a proxy server or other management component that is external from a subject network services component (e.g., web conferencing service). The methodologies described with reference to FIGS. 2, 3, 4 and 5 are directed to web conferencing services. However, it is to be understood that these methodologies and underlying functionalities can be employed in connection with other network services without departing from the spirit and/or scope of the innovation.

At 204, a determination can be made to identify if the virus scanning application is available. For example, here, a determination can be made if a failure, timeout, overload or other performance altering issue has occurred. If it is determined that the scanning application is still available, the system returns to 202 and continues to monitor availability.

On the other hand, if at 204 it is determined that the virus scanning application is no longer available, users can be notified at 206 of the lack of scanning ability. Thus, it is possible to prohibit further uploads/downloads due to the unavailability of the scanning application. Alternatively and optionally, at 208, the system can offer users a bypass operation with regard to the scanning application.

In other words, here, the system can allow users to decide if they wish to continue to upload/download data and files without the protection of virus scanning technology. In alternative aspects, the system can provide logic, such as rules-based or machine learning and reasoning (MLR) mechanisms by which specific users can be chosen with regard to the optional bypass. Similarly, these logic means can be employed to allow/disallow upload/download based upon other criteria including but, not limited to, file type, sender identification, receiver identification, file content, file size as well as other contextual factors (e.g., time of day, current activity, etc.).

At 210, the virus scan availability can be recovered. In operation, once the issue clears (e.g., load is reduced), the system can automatically make the scanning application available to all users of the web conference. Similarly, if it is determined that a specific user, or group of users, caused or contributed to the preceding issue, at 210, logic can be employed to prohibit uploads/downloads from the user(s) in order to alleviate probability of future issues.

Figure 3:
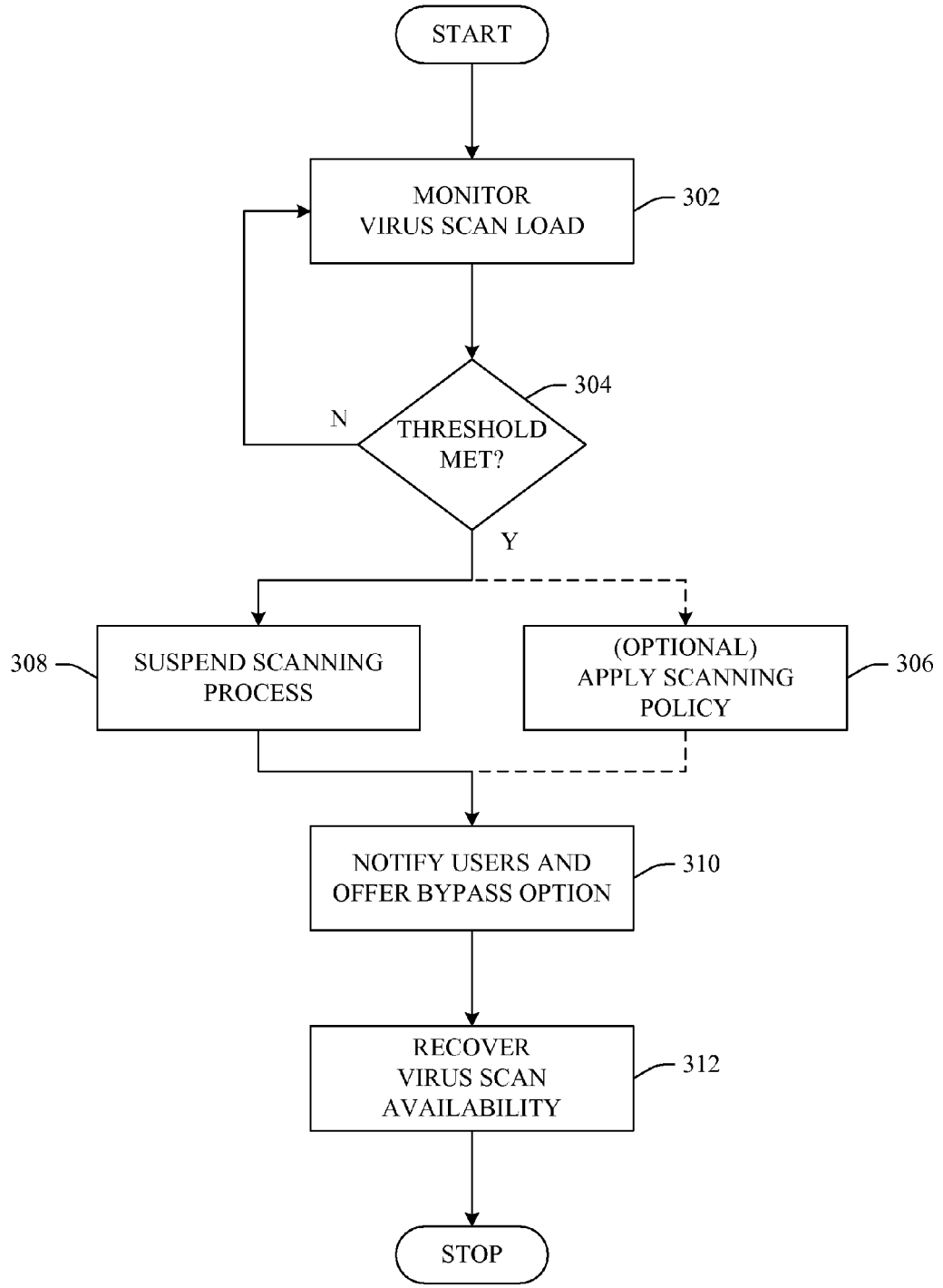
FIG. 3 illustrates an example flow chart of procedures that facilitate monitoring load of malware scanning mechanisms in accordance with an aspect of the innovation.

Referring now to FIG. 3, an example flow chart of procedures that facilitate reacting to load situations related to virus scanning applications is shown. At 302, the load of a remote virus scan application can be monitored. By way of example, the load can be monitored with regard to a predefined and/or dynamically inferred threshold.

At 304, a determination can be made to identify if the threshold had been met. Similarly, this determination can predict that the threshold will be met. Thus, proactive management can be employed thereby reducing unwanted exposure to uploads and/or downloads which have not been scanned within a conferencing session. If the threshold is not met, or similarly not expected to be met imminently, the methodology returns to 302 where the load is monitored.

However, if the threshold is met, or expected to be met, at 306, the system can automatically suspend all scanning processes. Here, upload/download capability can be halted in order to protect the system and users from corruption. Optionally, a scanning policy can be applied at 308. For example, a management component can employ the scanning policy in order to determine a level of threat, level of restriction, etc.

By way of further example, the policy can be employed to determine which users, if any, should be permitted to continue upload/download without the need for virus scanning. At 310, these users (or all users as the case may be) can be notified that the virus scanning process is unavailable. As well, the users can be optionally offered an option to bypass scanning and continue upload/download processes.

At 312, the virus (or malware) scan availability can be recovered. For example, in this scenario, once the excessive load has cleared, the scanning application can be made available to all users. It is to be understood that this act can be accomplished in stages rather than complete availability. For instance, if only limited processing is available, the system can employ logic to determine which users, if any, should be permitted to employ the scanning application. This decision can be based upon file type, sender identification, access control lists, or the like without departing from the spirit and/or scope of the innovation and claims appended hereto.

Figure 4:
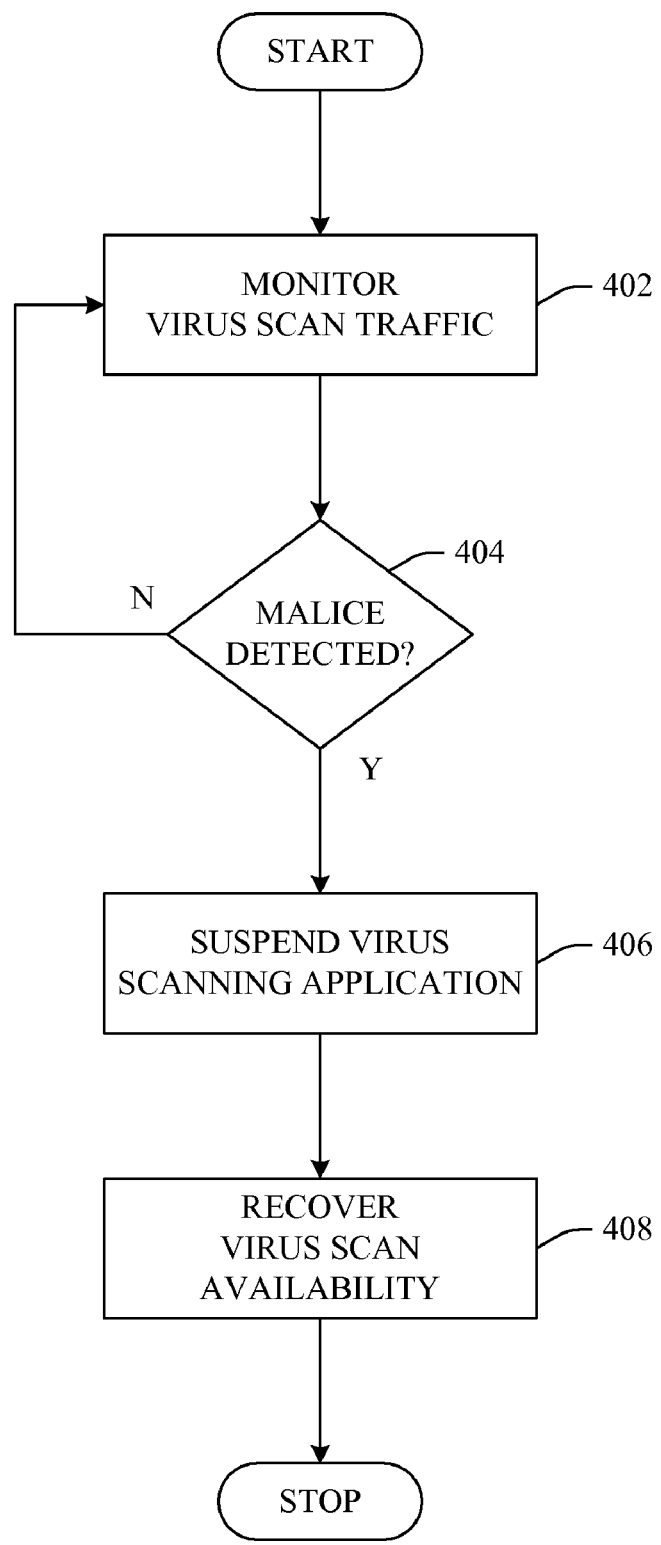
FIG. 4 illustrates an example flow chart of procedures that facilitate identification of malicious attacks related to malware scanning mechanism in accordance with an aspect of the innovation.

FIG. 4 illustrates an example flow chart of procedures that address malicious attack of virus scanning capabilities in accordance with an aspect of the innovation. At 402, virus scan traffic can be monitored in an attempt to discover malicious activity. A determination is made at 404 which identifies if malice has occurred. If malice is not detected, the flow returns to 402 where traffic is monitored.

On the other hand, if malice is detected, at 406, virus/malware scanning capabilities can be suspended. Accordingly, at 408, once the malice is cleared or eliminated, the virus scanning application can be recovered. As described above, it is also possible to notify all, or a select group of users regarding potential malice. Moreover, if desired, it is possible to offer users to continue upload/download activities without the scanning application while the malice is contained and the application is recovered.

Figure 5:
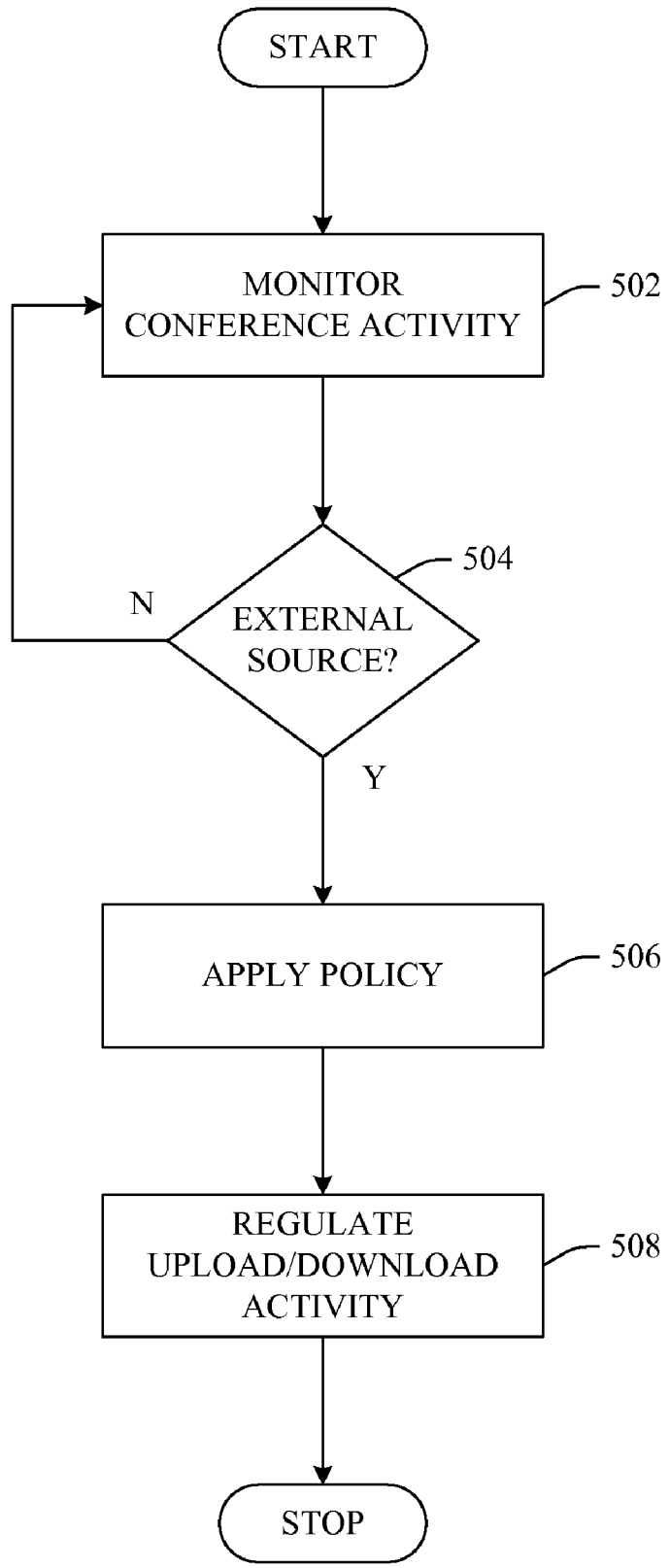
FIG. 5 illustrates an example flow chart of procedures that facilitate application of a policy to selectively manage scanning mechanisms in accordance with an aspect of the innovation.

FIG. 5 illustrates an example flow chart of procedures by which a policy can be employed to manage operation and availability of a scanning application. At 502, activity of a web conference environment can be monitored. More particularly, in this aspect, identification of active conference members can be monitored. Additionally, criteria associated with each of the members can be established, for example, location, organizational affiliations, association to the conference, association to other members of the conference, etc.

In one example, at 504, a determination can be made to identify if any of the members are transmitting from, located in or affiliated with an external source. For instance, suppose the conference is sponsored by ABC company. Here, at 504, members that are not using ABC company's network, or for that matter affiliated with ABC company, will be flagged. As illustrated, if no external sources are identified, conference activity can continue to be monitored.

At 506, a policy can be applied which is directed toward managing the operation of or permitted bypass of scanning applications. For instance, continuing with the above example, if an issue is encountered with the scanning application, and members are identified as being affiliated with XYZ company, the policy can be applied at 506 to prohibit upload/download operations by these members of the conference. In other words, at 508, upload/download activity can be regulated based upon a particular member's affiliations, origination or identification.

Although the aforementioned example is directed to identification of external sources, it is to be understood that a policy can be applied to regulate upload/download activity based upon most any factor or parameter. For instance, policies can be applied as a function of factors which include, but are not limited to, conference topic, conference members, file type, file content, as well as other contextual factors (e.g., time/day, location, engaged activity).

Figure 6:
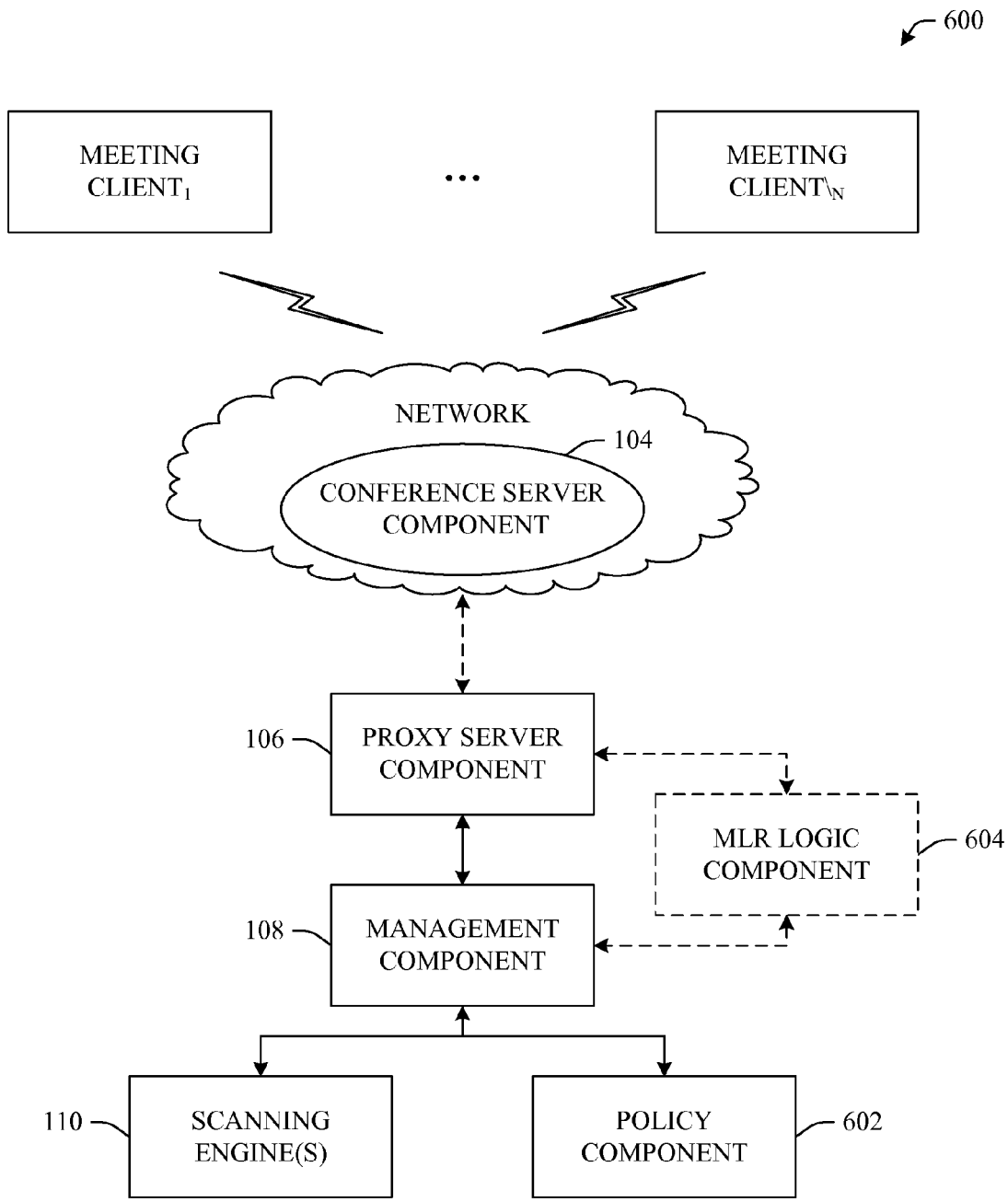
FIG. 6 illustrates an architecture including a machine learning and reasoning-based component that can automate functionality in accordance with an aspect of the innovation.

Referring now to FIG. 6, an alternative block diagram of a system 600 that facilitates scanning engine management in a web conferencing environment is illustrated. As described above with reference to the preceding figures, the innovation can employ a variety of approaches in the management of scanning engines 110.

In one aspect, the system 600 can detect a failure (or other issue, e.g., overload) of a scanning component (110) and automatically react in order to effectively address solution. As illustrated in FIG. 6, the proxy server component 106 together with the management component 108 can prompt recovery of the scanning engine 110.

Additionally, the management component 108 can employ logic in order to further enhance operation of the conference server component 104. For example, conventionally, when an issue arose with regard to the integral scanning solution, the conference service was also effected thereby halting the ability to continue with the conference. Unlike conventional systems, the subject innovation decouples the scanning management thereby enabling logical solutions in the event of a scanning application issue.

Accordingly, in the event of a failure, the management component 108 can employ the policy component 602 to identify conference members that can be permitted to continue without the ability to scan documents in upload/download operations. Similarly, in the event of an overload, the policy component 602 can determine an optimal or efficient method to employ limited resources. This policy can be based upon, user identifications, file type, file content, or the like. In case of unrecoverable failure of services, the management component 108 can inform users of the failure and, if the user is comfortable with the authenticity of the file, an option can be presented to upload and download files without scanning for harmful agents.

Additionally, an MLR logic component 604 can be employed to determine (e.g., based upon inference) a manner by which to address issues with scanning operations. The MLR component 604 can facilitates automating one or more features in accordance with the subject innovation. In other words, the MLR logic component 604 can facilitate automation of one or more of the functions of the proxy server component 106 or the management component 108.

The subject innovation (e.g., in connection with formulating a policy) can employ various MLR-based schemes for carrying out various aspects thereof. For example, a process for determining which users to prohibit and which to allow to upload/download in a crisis-situation can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which users can continue to upload/download when scanning services are unavailable, which types of files can be uploaded/downloaded in a particular context, etc.

In another example, the system 100 can monitor load conditions, for example, the system can detect heavy load conditions and thereafter offer a solution in the event of a failure or timeout of the scanning operations. In operation, the proxy server component 106 can detect genuine heavy load conditions with regard to the scanning applications. Accordingly, the scanning queue can be cleared in order to address most any overload condition.

Moreover, the proxy server 106, in conjunction with the management component 108 can accept the file upload/download requests after certain random, inferred or defined time and thereafter, essentially throttle the same. In this manner, load conditions can be controlled. In situations where a time-out continues which prohibits users from uploading/downloading of files, the management component 108 can offer specified users an option to bypass scanning operations thereby alleviating impact of the timeout on the productivity of the web conference.

As described above, a policy component 602 and/or MLR logic component 604 can be employed to determine bypass parameters. For example, one bypass parameter may be based upon users of a specified protected domain or group of domains. Another parameter can be directed to a type or size of file. It is to be understood that the policy component 602 and the MLR logic component 604 can employ most any parameter when determining or inferring bypass options or preferences.

In yet another aspect, the system 600 can be employed to identify malicious attacks on the conference server component 104. More particularly, the system 600 can identify malicious agents that upload files in an attempt to cause virus scanning software to malfunction and cause timeout. Here, the system can allow this malicious file(s) to time-out thereby distinguishing it from a genuine time-out where user is given an opportunity to upload files while bypassing the scanning system.

In addition to the functionality described above, the policy component 602 can provide an option of stringent virus check measures. For example, the policy component can dictate when to allow uploads/downloads. In one aspect, the policy component 602 can prohibit uploads or downloads if the user chooses safety over availability. This is particularly pertinent if in an organization most people join meetings from outside corporate networks where virus infection can become more likely and therefore, a presenter's decision can not be depended upon with a high degree of certainty.

Figure 7:
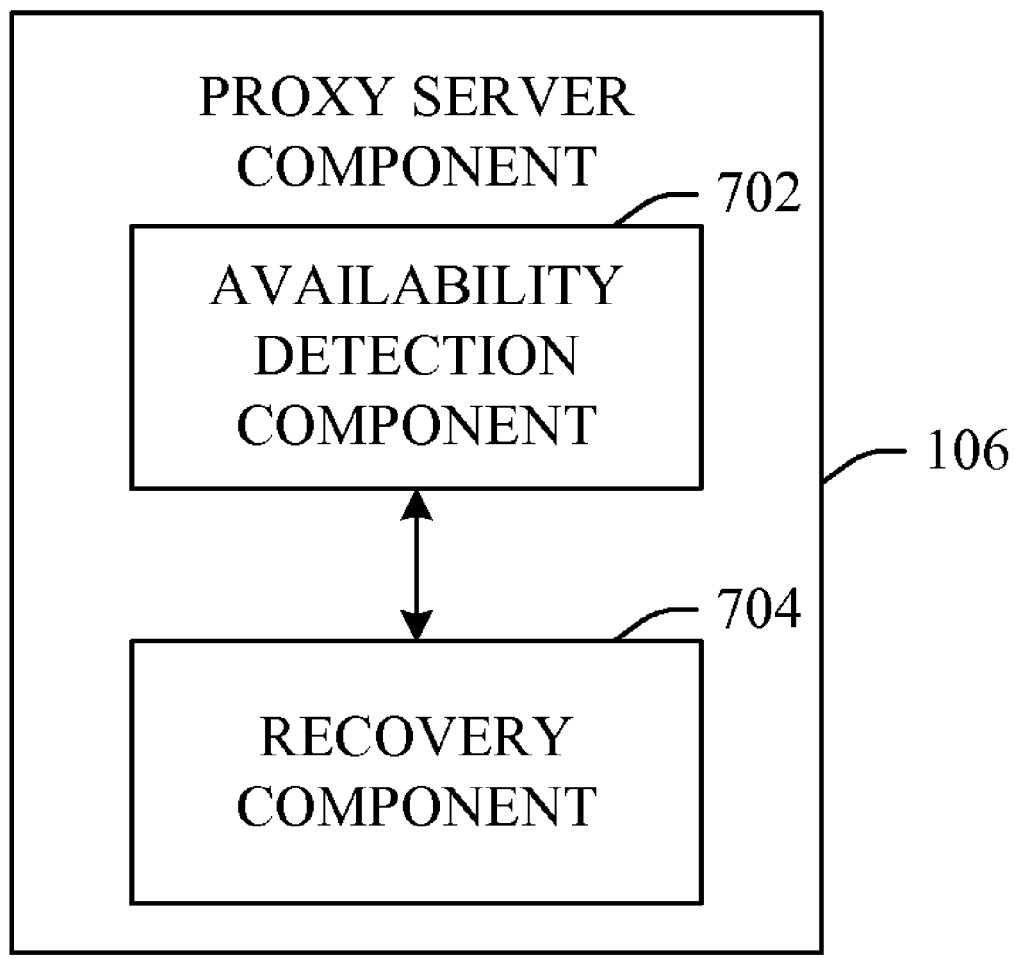
FIG. 7 illustrates an example block diagram of a proxy server component that facilitates the 'out-of-proc' employment of malware scanning mechanisms in accordance with an aspect of the innovation.

Turning now to FIG. 7, an example block diagram of a proxy server component 106 in accordance with an aspect of the innovation is shown. Generally, the proxy server component 106 can include an availability detection component 702 and a recovery component 704. While although a proxy server implementation is illustrated and disclosed, it is to be appreciated that other architectures can be employed that enable the scanning application to run out-of-proc (out of process), as opposed to in-proc (e.g., in process or compiled into a shared directory) with respect to conventional systems.

The implementation can be carried out by making virus scanning software run 'out-of-proc' from the conferencing server. A proxy server component 106 which communicates and intermediates with virus scanning applications (e.g., 110 of FIG. 1) can be implemented. This proxy server component 106 can detect the unavailability of the scanning applications (110) in at least the following ways:

In one example, the proxy server component 106 can employ the availability detection component 702 to detect a failure in connection to the software application(s) (110). This can be accomplished by identifying that the out-of-proc scanning application is unresponsive or has crashed.

In an alternative example, the availability detection component can assess load conditions to determine and/or infer unavailability of the scanning application(s) (110). In one embodiment a preset number of consecutive timeouts (e.g., five consecutive timeouts) for requests can be deemed indicative of an issue or problem with scanning applications (110). It is to be understood that all such requests can come from different meetings and from different accounts. These requests can be aggregated and considered in the analysis of deeming if a problem or issue arose.

It is to be understood that a malicious user will have to cause timeouts consecutively in order to falsify a genuine load condition from different meetings and from a different conference center where it can be considered as a genuine load condition. Thus, the availability detection component 702 can also address and identify these conditions and/or situations.

Upon determining load conditions or other performance altering situations, the recovery component 704 can be employed to recover from most any pending issue. For instance, the issue can be a load condition or a failure. In the load scenario, the recovery component 704 can throttle the load by first clearing all pending virus scans the queue.

Figure 8:
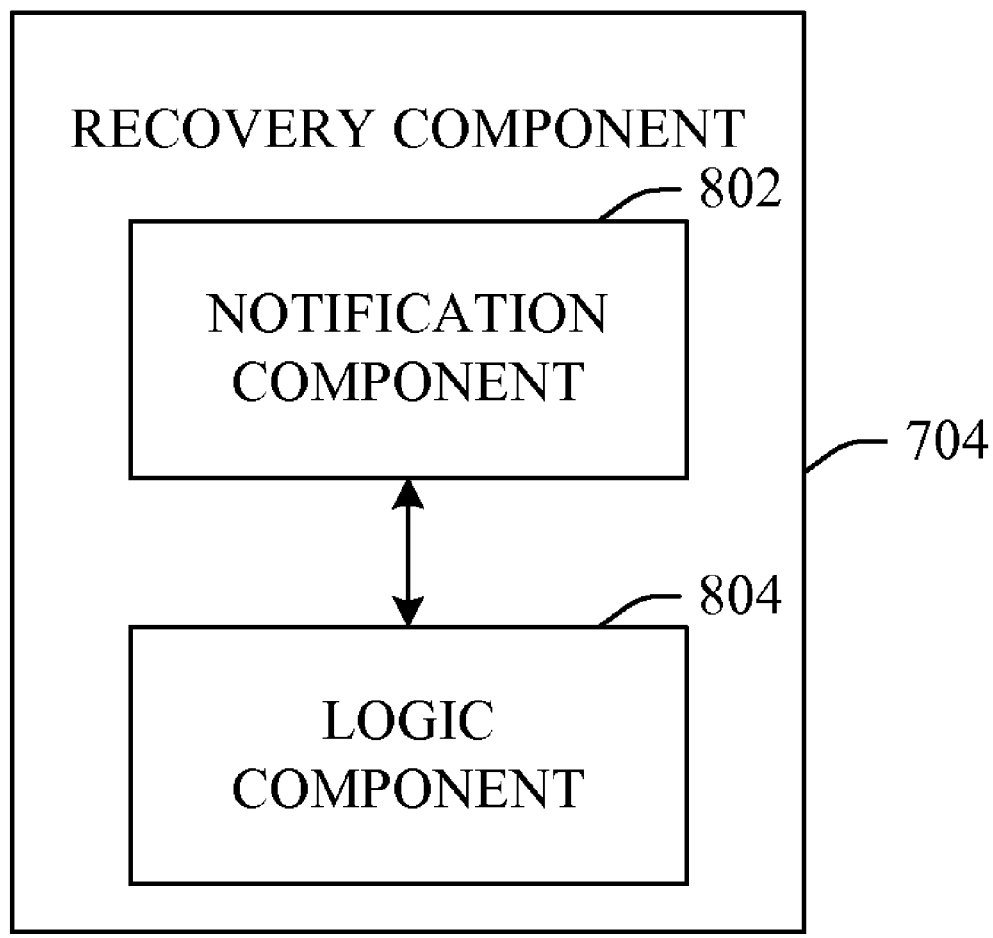
FIG. 8 illustrates an example block diagram of a recover component that facilitates notification and recovery of issues related to scanning mechanisms in accordance with aspects of the innovation.

As illustrated in FIG. 8, the recover component 704 can employ a notification component 802 to advise users of the issue and to optionally suggest to upload files some time later, for example, after the load is balanced. The logic component 804 can employ policies in order to determine which user, or group of users, is permitted to upload/download files. This permission may be granted after a predefined elapsed time. In one aspect, this time frame can be established by the logic component 804. For instance, the time frame can be obtained by generating a pseudo random number which lies between 10 seconds and 180 seconds so that the file upload and hence scanning requests are effectively throttled.

In one example, if the load condition is reached again, the scanning service may be considered unavailable. Once the scanning application is deemed unavailable, the logic component 804 can provide (based upon rule, policy, MLR mechanisms) the user an option to upload/download files considered safe. The user downloading a file can also be warned about the same. As described above, these decisions (or inferences) can be based upon most any criteria including but, not limited to, sender identification, sender domain, affiliations, file type, file size, etc.

Since such unavailable conditions are most often not permanent conditions, the conferencing software can commence resending the new requests for scanning after a certain finite duration of time. In operation, there are at least three possibilities of administration. First, if the issue with the scanning application (110) is because of some programmatic failure, then the recovery process can include restart of scanning software and proxy service, which will have recovered out of the condition.

Secondly, if the unavailability of the scanning application (110) is due to load conditions, then after this finite duration, the load conditions can be reduced. As described supra, the temporary flexibility of allowing upload/download of files without scanning upon user request should not affect security to a significant degree. However, it is to be understood that this bypass is optional and is not to be considered mandatory to the recovery process.

In particular aspects, the solution allows account administrators of customers who have purchased accounts with the service to selectively prohibit the bypass functionality. In these cases, upon failure, the user can wait for a finite duration after which scanning software can automatically recover. In case of heavy load, uploads/downloads can be throttled which can provide the service in optimal fashion.

Malicious software attack causing denial of service can be distinguished from the above. Also such attacks can be judged based upon assigning (or inferring) a dynamic timeout value depending upon peak scanning time for successful uploads of range of file type and a range of file size observed over a period. A dynamic time-out value can be set to twice this success full time so that a malicious time-out is detected and such a scanning request can be cancelled before it causes overload on the system causing more time.

Figure 9:
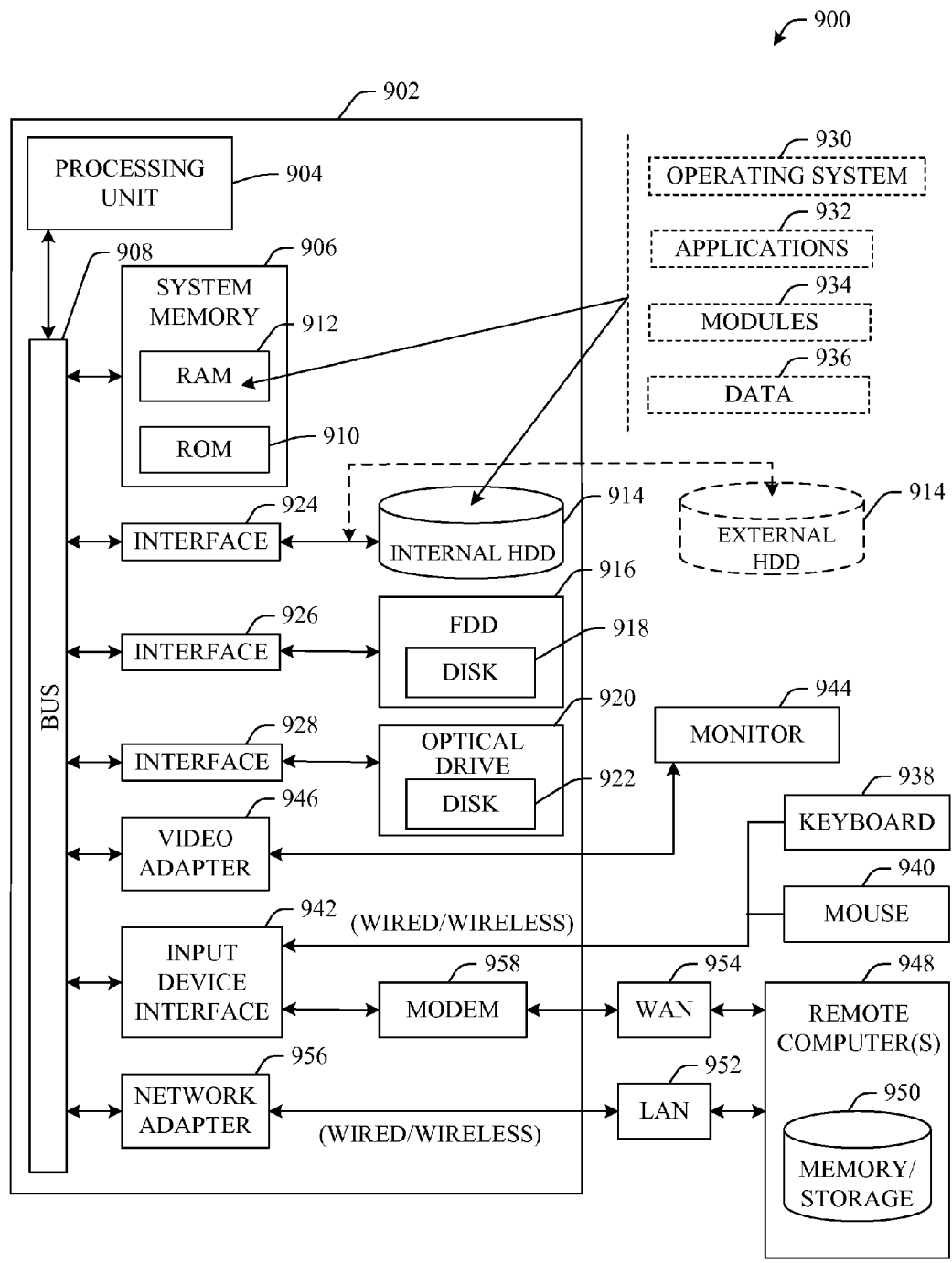
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
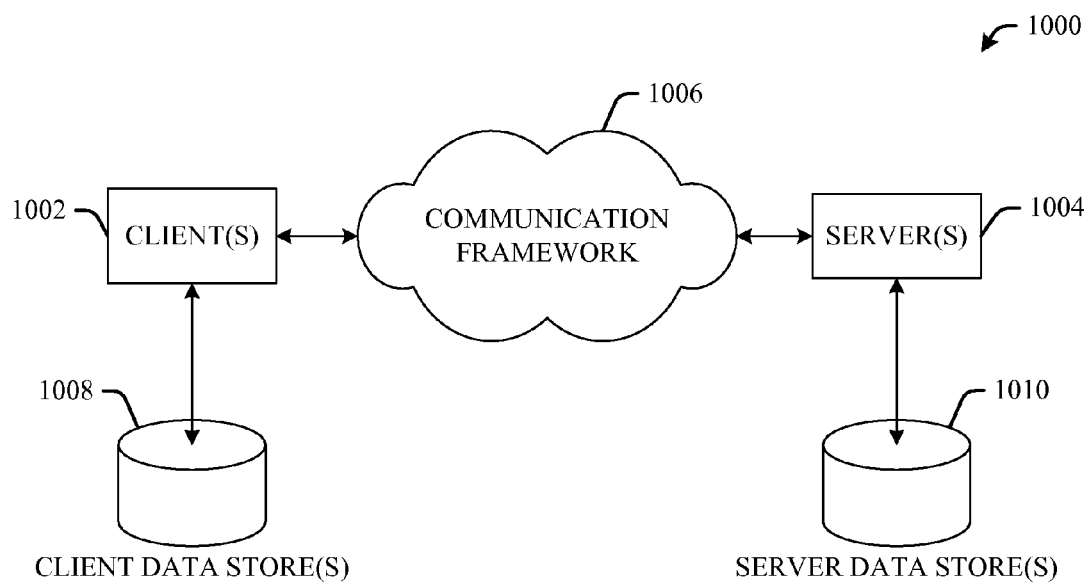
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising at least one processor coupled to at least one machine-readable storage medium storing instructions executable by the at least one processor to implement:

a proxy server configured to facilitate access to a scanning engine associated with a network live meeting conference service, wherein the scanning engine is configured to check traffic corresponding to a plurality of members of said conference service for harmful data; and a management component configured to regulate operation of the scanning engine as a function of availability of the scanning engine, at least in part by suspending scanning operations and enabling a subset of the plurality of members to continue the network live meeting conference service while the scanning operations are suspended in response to exceeding a load threshold of the scanning engine.

2. The system of claim 1, further comprising a policy component configured to define a procedure of regulating operation of the scanning engine.

3. The system of claim 1, wherein the policy component is configured to employ an access control list to regulate operation of the scanning engine.

4. The system of claim 1, wherein the policy component is configured to employ a type of data to regulate operation of the scanning engine.

5. The system of claim 1, further comprising:
an availability detection component configured to detect a performance issue related to the scanning engine; and
a recovery component configured to enable initiation of the scanning engine upon correction of the detected performance issue.

6. The system of claim 5, wherein the performance issue includes at least one of a failure, overload or timeout.

7. The system of claim 5, further comprising a notification component configured to notify a subset of the members of the performance issue.

8. The system of claim 7, further comprising a logic component configured to select the subset as a function of a policy.

9. The system of claim 1, further comprising machine learning and reasoning component configured to employ at least one of a probabilistic or a statistical-based analysis to infer an action to be automatically performed.

10. A computer-implemented method, comprising:
monitoring availability of a malware scanning application for a conference application supporting a live meeting conference conducted over a communications network;
determining an issue with the malware scanning application in responcse to exceeding a load threshold of the canning application;
sending a notification of the load issue of the scanning application to a plurality of entities participating in the conference, wherein the plurality of entities are connected via the conference application;
suspending operation of the malware scanning application based on the load issue of the scanning application; and
enabling a subset of the plurality of entities to continue participation in the conference while bypassing operation of the suspended malware scanning application.

11. The computer-implemented method of claim 10, further comprising automatically recovering from the issue.

12. The computer-implemented method of claim 10, further comprising, based on the monitoring the availability of the malware scanning application, detecting that an absence of the availability is due to malicious activity rather than a genuine load based on an occurrence of a preset number of consecutive time-outs.

13. The computer-implemented method of claim 10, further comprising:
monitoring a load of the malware scanning application; and
determining the issue based upon the load in view of a threshold.

14. The computer-implemented method of claim 13, further comprising suspending operation of the malware scanning application if the load exceeds the threshold.

15. The computer-implemented method of claim 10, further comprising recovering from the issue at least in part by clearing all pending virus scans from a queue.

16. The computer-implemented method of claim 10, further comprising detecting malicious use of the malware scanning operation, wherein the malicious use defines the issue.

17. A computer-readable storage device storing instructions, the instructions if executed by a processor causing the processor to perform operations comprising:
identifying a problem with a remote malware scanning application for scanning traffic corresponding to a plurality of members of receiving a network live meeting conference service for harmful data;
suspending operation of the remote malware scanning application as a function of the problem in response to exceeding a load threshold of the scanning application, while enabling a subset of the plurality of members to continue to receive the service; and
restarting the remote malware scanning application based upon correction of the problem.

18. The computer-readable storage medium of claim 17, the operations further comprising:
determining availability of the remote malware scanning application; and
employing the availability to assess the problem.

19. The computer-readable storage medium of claim 17, the operations further comprising notifying the plurality of members of the problem.

20. The computer-readable storage medium of claim 19, the operations further comprising providing the plurality of members an option to bypass the operation of the remote malware scanning application.

* * * * *

UNITED STATES PATENT AND TRADEMARK OFFICE
CERTIFICATE OF CORRECTION

| | |
|---|---|
| PATENT NO. | : 8,181,245 B2 |
| APPLICATION NO. | : 11/764931 |
| DATED | : May 15, 2012 |
| INVENTOR(S) | : Ashutosh Tripathi et al. |

Page 1 of 1

It is certified that error appears in the above-identified patent and that said Letters Patent is hereby corrected as shown below:

In column 15, line 43, in claim 10, delete "responcse" and insert -- response --, therefor.

In column 15, line 44, in claim 10, delete "canning" and insert -- scanning --, therefor.

Signed and Sealed this
Ninth Day of October, 2012

David J. Kappos
*Director of the United States Patent and Trademark Office*